W. Wharton, Jr.
Railroad Switch,
No. 942. Reissued Apr. 3, 1860.
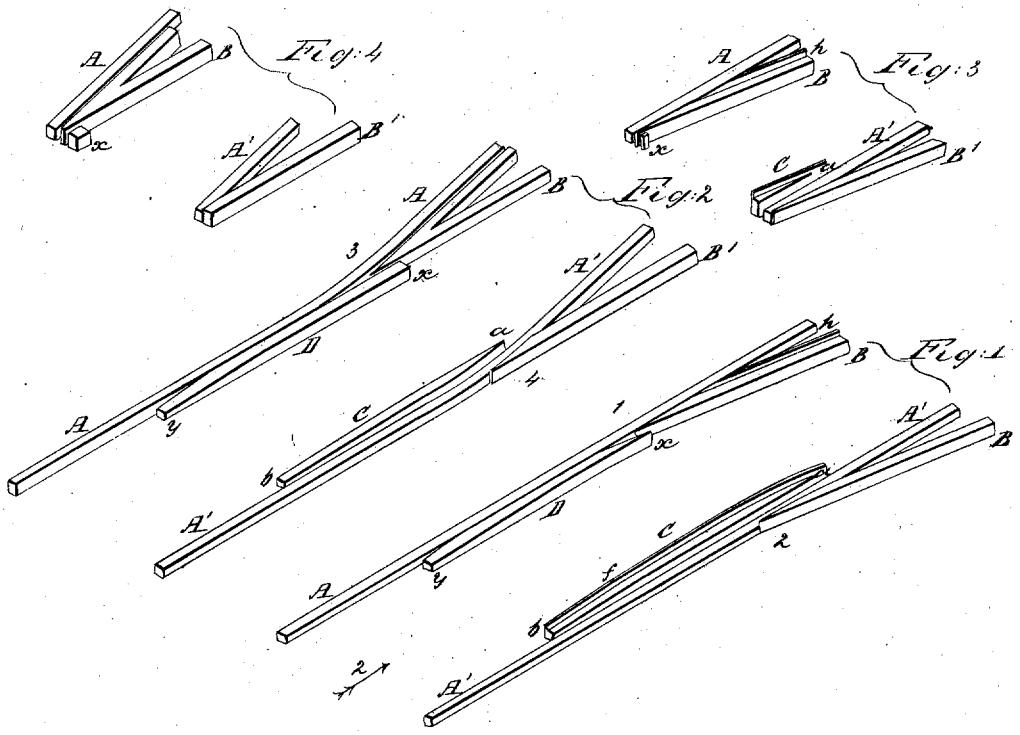
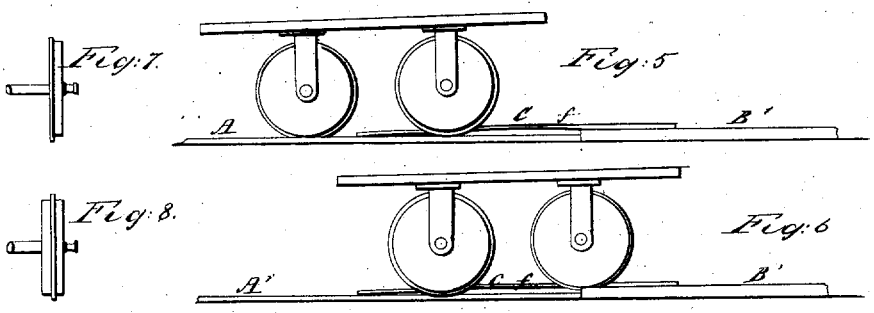
Witnesses
Henry Howson
Horace See
Inventor
Wm Wharton Jr
N. PETERS, PHOTO-LITHOGRAPHER, WASHINGTON, D. C.

UNITED STATES PATENT OFFICE.

WILLIAM WHARTON, JR., OF PHILADELPHIA, PENNSYLVANIA.

IMPROVEMENT IN DISPENSING WITH SWITCHES ON RAILROADS.

Specification forming part of Letters Patent No. 26,454, dated December 13, 1859; Reissue No. 942, dated April 3, 1860.

*To all whom it may concern:*

Be it known that I, WILLIAM WHARTON, Jr., of the city and county of Philadelphia, and State of Pennsylvania, have invented a new and Improved Mode of Transferring Railway-Cars from One Track to Another; and I do hereby declare the following to be a full, clear, and exact description of the same, reference being had to the accompanying drawings, and to the letters of reference marked thereon.

My invention relates to a mode of dispensing with the ordinary movable tongues which are used for transferring cars from one track to another, and which require the services of an attendant; and my invention consists in the employment, in connection with turn-outs or sidings, of supplementary inclined or raised rails, in combination with car-wheels so constructed as regards the said inclined rails, and the latter being so arranged as regards the rails at the siding or turn-out that the wheels may be elevated above and free from the control of the rails of one track and be placed under the control of those of another track, as fully described hereinafter.

In order to enable others skilled in the art to make and use my invention I will now proceed to describe the manner in which I carry it into effect.

On reference to the accompanying drawings, which form a part of this specification, Figure 1 is a perspective view of part of a railway track and siding or turn-out, illustrating my improvement; Fig. 2, a modification of Fig. 1; Fig. 3, a sectional perspective view on the line 1 2, Fig. 1; Fig. 4, a sectional perspective view on the line 3 4; Fig. 2, Figs. 5 and 6, side views of the track, Fig. 1 looking in the direction of the arrow 1 and illustrating my improved mode of transferring the cars from the main track to the siding; and Figs. 7 and 8, edge view of the wheels used on the cars for carrying out my improvement.

On reference to Fig. 1, A and A′ are the two rails of the main track, and B and B′ the two rails of the siding. The rail B′ tapers gradually to a comparatively sharp edge toward the point where it meets the rail A′ of the main track, at which point and for a considerable distance beyond the same its upper surface is elevated above that of the rail of the main track, as will be best observed on reference to the sectional perspective view Fig. 3. On the inside of the rail A′ is a supplementary rail, C, the latter being a sufficient distance from the former to allow the flanges of the wheels liberty to pass freely between the two rails. It will be observed that the tread of this rail C at the point opposite to the termination of the rail B′ is on the same level as the tread of the latter rail, both being elevated to the same height above the tread of the main rail A′. From this point the supplementary rail C is curved outward in the direction of the rail B′ of the siding, its tread terminating at the point *a* where it is elevated above the main rail A′ to the same extent as the rail B′. The tread of the rail C, however, from a point about opposite to the termination of the rail B′ inclines gradually downward toward its inner termination, *l*, at which point it is on the same level as the tread of the main rail A′. This supplementary rail is furnished with a flange, F, which serves to direct the wheels of the car toward the siding or turn out. On the opposite side of the track the rail B of the siding has a tapering end, which is as close to the inside of the main rail A as a free passage for the flanges of the wheels will allow, the altitude of the tread of this rail above the main rail A being the same as the height of the tread of the siding-rail B′ above that of the rail A′. This rail B is provided with the usual guiding-flange, *h*, for the same purpose as that on the supplementary rail *c*. The supplementary rail D is secured to the track on the inside of the rail A, and at such a distance from the latter that the flanges of the wheels can pass freely between the two. This rail D is slightly curved inward toward its outer termination, *x*, which projects beyond the termination of the rail B, the tread of the rail at this its outer termination being on a level with that of the rail B the tread of this supplementary, however, inclining gradually downward toward its inner termination, *y*, where it is on a level with the tread of the main rail A, its inclination coinciding with that of the supplementary rail *c*. Now, supposing a car furnished with ordinary wheels, such as are seen in Fig. 7, to be on the rails A and A′ of the main track, and that it is traversing in the direction of the arrow 2, Fig. 1, it will be evident that there is a clear passage for the flanges both between the rails A′ and supplementary rail C, as well as between the rail A and the supplementary rail D, also between the same rail A and the end of the rail B, the car will take a direct course along the rails A and A′ of the main track. Supposing the car, however, to be provided with wheels similar to those shown in Fig. 8—that is, with two treads, one tread on the inside of that required for traversing the main rails A and A′ of the track, and the two treads being separated by a flange—in this case the car would traverse the main track, the wheels bearing on the rails of the same until it reached the inclined supplementary rails C and D, upon which the inside tread of the wheels would bear, and, ascending the inclined planes, would elevate the outside treads free from contact with the main rails A and A′, as will be best observed on reference to Fig. 5, where the front wheels are shown as having commenced the ascent of the inclined supplementary rails. As the wheels continue to ascend their flanges are elevated above the main rails A and A′, and are consequently beyond the control of these rails, so that by the time the front wheels arrive at the position shown in Fig. 6 the outer tread of one of the near wheels will be bearing on the tapering ends of the rail B′ and the inner tread of the same wheel on the curved end of the supplementary rail C, while the outer tread of the far wheel is bearing on the tapering end of the rail B and the inner tread on the curved end of the supplementary rail D, the flanges of both wheels being elevated free from contact with the treads of the main rails of the track. As the wheels continue to move they will leave the supplementary rails and continue to traverse with their outer treads one wheel on the rail B and the other on the rail B′ of the sliding or turn-out, the flange *h* of the rail B and the flange of the supplementary rail C tending to guide the wheels laterally on to the rails of the siding as they leave the supplementary rails.

It will be seen without further explanation that the cars are transferred from the main track to the siding by gradually raising their wheels free from the control of the rails of the main track and placing them under the control of those of the siding, and not by any lateral strain such as is usually imparted to cars on making the same transfer by the devices hitherto employed for that purpose. It will also be seen that the transfer is accomplished without that sudden jar which usually accompanies the passage of cars from one track to another, for the inclination of the supplementary rails may be made so gradual that the ascent is scarcely perceptible, and the ends of the supplementary rails at the point where they overlap the ends of the siding-rails, being on the same level as the latter, the traverse of the wheels at this point must be as even and as free from all sudden jars as though they traversed an ordinary straight rail. Precisely the same result is accomplished in the modification illustrated by Fig. 2, in which the rails A and A′ are curved and the rails B and B′ of the siding take a direct course in a line with the main rails.

It will be readily seen that the cars furnished with the wheels Fig. 7 will take the direction of the rails A and A′, while the cars having the wheels Fig. 8 will be transferred from the main track onto the rails B and B′ of the siding by the lifting process described on reference to Figs. 1, 5, and 6.

Although I have alluded to the rails A and A′ as those of the main track, they may represent those of the siding, the main track being formed by the rails B and B′.

It will be observed that while the same principle of inclined supplementary rails for raising the cars and transferring them from one track to another is maintained, they may be considerably modified as regards their disposal and arrangement, and that the construction of the wheels for acting in conjunction with these supplementary rails may be also modified, so that instead of two treads on the same wheel, separate supplementary wheels, or wheels with more than two treads and treads of different diameters, may be used. I therefore do not desire to confine myself to the precise arrangement and construction of parts herein described; but

I claim and desire to secure by Letters-Patent—

The employment, in connection with the sidings or turn outs on railways, of supplementary inclined and elevated rails, in combination with car-wheels so constructed as regards the said inclined rails, which are so arranged as regards the rails of the siding or turn-out that the wheels may be elevated above and free from the control of the rails of one track and be placed under the control of those of another track, as herein set forth.

In testimony whereof I have signed my name in the presence of two subscribing witnesses.

WM. WHARTON, JR.

Witnesses:
HENRY HOWSON,
CHARLES D. FREEMAN.